United States Patent [19]
Haacke

[11] 3,914,389
[45] Oct. 21, 1975

[54] LANTHANUM OXIDATION CATALYST AND METHOD FOR UTILIZING THE SAME

[75] Inventor: Gottfried C. Haacke, Stamford, Conn.

[73] Assignee: American Cyanamid Company, Stamford, Conn.

[22] Filed: Mar. 22, 1974

[21] Appl. No.: 453,619

[52] U.S. Cl. .................. 423/263; 34/5; 252/462; 252/471; 252/476; 423/593; 423/599; 423/213.2; 423/247; 423/245; 423/437
[51] Int. Cl.² .................. C01F 17/00; C01G 45/00
[58] Field of Search ............... 423/263, 599, 593; 252/462, 471; 34/5

[56] References Cited
UNITED STATES PATENTS

| | | | |
|---|---|---|---|
| 3,422,167 | 1/1969 | Bowman et al. | 34/5 |
| 3,440,732 | 4/1969 | Chiola et al. | 34/5 |
| 3,681,011 | 8/1972 | Gazza et al. | 423/263 |
| 3,796,793 | 3/1974 | Metzer et al. | 423/263 |
| 3,865,752 | 2/1975 | Remeika et al. | 252/462 |
| 3,865,923 | 2/1975 | Stephens | 252/462 |

OTHER PUBLICATIONS

Blasse, "Journal Phys. Chem. Solids," Vol. 26, 1965, pp. 1969–1971.

*Primary Examiner*—Herbert T. Carter
*Attorney, Agent, or Firm*—Harry H. Kline

[57] ABSTRACT

There is provided a novel oxidation compound having the structure:

$$La\ Cu_{0.5}\ Mn_{0.5}\ O_3$$

and utilizing the aforementioned oxide as an oxidation catalyst and, specifically, as an oxidation catalyst to convert carbon monoxide to carbon dioxide in an auto exhaust system.

4 Claims, No Drawings

LANTHANUM OXIDATION CATALYST AND METHOD FOR UTILIZING THE SAME

The present invention relates to a novel non-noble metal oxidation catalyst having good oxidation activity and high thermal stability. More particularly, the invention is concerned with a certain lanthanum copper manganese oxide, defined hereinbelow, which exhibits enhanced oxidation activity and high thermal stability.

It is known that lanthanum cobalt oxides exhibit good oxidation activity. Unfortunately, they exhibit relatively poor thermal stability at elevated temperatures. Such temperatures are required for oxidation catalysts, for example in auto exhaust systems. Therefore, if an oxidation catalyst can be provided which possesses both good oxidation activity and high thermal stability, such catalyst would satisfy a long felt need in the art.

It has been unexpectedly found that a lanthanum copper manganese oxide having the structure:

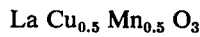

$$La\ Cu_{0.5}\ Mn_{0.5}\ O_3$$

exhibits good oxidation activity and high thermal stability. As such, the lanthanum copper manganese oxide, above defined, finds utility as an oxidation catalyst, particularly as an oxidation catalyst in a catalyst auto-exhaust system which requires that the oxidation of hydrocarbons and carbon monoxide be carried out at relatively high reaction temperatures.

According to the process of the invention, the lanthanum oxide is prepared by dissolving in an aqueous medium predetermined equivalent amounts of (a) a copper salt, such as copper nitrate (b) a lanthanum salt, such as lanthanum nitrate, (c) a manganese salt, such as manganese nitrate. The resultant mixture which comprises a mixed salt solution is next introduced as by spraying into a closed, liquid nitrogen filled container. Upon completion of the latter step, the liquid nitrogen is evaporated and the contents in the container are subjected to vacuum distillation where the water and other solutes, if any, are removed leaving a solid residue. The latter is heated to a temperature between about 225°C. and about 275°C. to convert the nitrates to a fluffy oxide which additionally possess a surface area of from about 10 m²/g to about 50 m²/g and a black coloration.

To further illustrate the invention the following example which is merely illustrative is presented. It is understood that the example presented is not deemed to be limitative. Unless otherwise noted, the parts stated are by weight.

EXAMPLE 1

PREPARATION OF La Cu.₅ Mn.₅ O₃

In a suitable vessel are added 3.39 gms. $Cu(NO_3)_2 \cdot 3H_2O$, 12.14 gms. $La(NO_3)_3 \cdot 6H_2O$, and 4.82 gms. 52% $Mn(NO_3)_2$ solution. Resultant mixture is dissolved in 250 parts of water. This nitrate solution is introduced into a chromatography sprayer and sprayed into a suitable beaker filled with liquid nitrogen standing in a liquid nitrogen containing dewar flask. After completion of the spraying, the beaker with the frozen material is removed manually from the dewar and the liquid nitrogen boiled off. As soon as the liquid nitrogen evaporated, the beaker is transferred to a bell jar of a high vacuum system i.e., $10^{-6}$ mm Hg and the system kept under vacuum until all the solution and hydration wastes had been removed. The completely dried material is kept under vacuum and decomposed to the mixed oxide by slowly heating it to approximately 250°C. Decomposition of the mixed nitrates to oxides is accompanied by a color change to black. After turning black throughout, the material is removed from the vacuum system. It is extremely fluffy and has a surface area of about 35 m²/g. The derived material is finally obtained by annealing the mixed oxide for 72 hours at 650°C. in oxygen. Subsequent to this heat treatment step, the material is crystallized in a perovskite phase according to X-ray analysis.

The lanthanum compound exhibits a surface area of 1.4 m²/gm. and its hydrocarbon and carbon monoxide lightoff temperatures are 549° and 281°F., respectively, "the light-off temperature" being defined as the temperature at which 50% conversion occurs. The light-off temperatures are obtained by following the procedure hereinafter set forth:

Catalyst performance is determined by measuring the hydrocarbon and carbon monoxide conversion as a function of reaction temperature. The percentage of conversion measured by a vapor phase chromatograph is automatically plotted by an X-Y recorder as a function of temperature. The temperature on the graph corresponding to 50% conversion is defined as the light-off temperature and is used to compare the oxidation activities of different catalyst compositions. A low light-off temperature indicates a high oxidation activity.

The reactor for measuring the light-off temperature consists of a stainless steel tubing in which a given amount of catalyst sample was placed. It is located in a heated air bath whose temperature is precisely controlled and could be automatically changed by a programed temperature controller. A coil of stainless steel tubing at the inlet of the reactor serves as a preheater of the test gas which is flowing through the system of a constant space velocity. Usually, 1 cc of the catalyst per 25,000 cc to 50,000 cc per hour of the gas composition which consists of a mixture of carbon monoxide, oxygen, propylene and nitrogen which has been bubbled through a constant temperature bath so that it acquires 10% water is employed.

After passing through the reactor the oxidized reaction products are introduced into a vapor phase chromatograph for analysis. The percentage of carbon monoxide oxidized to carbon dioxide and the percentage of propylene oxidized to carbon dioxide and water are determined by the chromatograph and the data fed into an X-Y recorder.

Advantageously, the lanthanum catalyst of the present invention exhibits both good oxidation activity ranging from about 200° to 300°F. or higher, with respect to the low light-off temperatures and good thermal stability.

I claim:

1. A process for the preparation of a lanthanum compound of the structure: $La\ Cu_{.5}\ Mn_{.5}\ O_3$ which consists in the steps of: dissolving in an aqueous medium to form a solution therein a copper salt, a lanthanum salt, and a manganese salt in an equivalent amount to provide the compound, $La\ Cu_{.5}\ Mn_{.5}\ O_3$, introducing the said solution into a container filled with liquid nitrogen, evaporating the nitrogen content therein, distilling under vacuum resultant residue to remove water therein, heating the residual salts so recovered at a temperature between about 225°C. and 275°C., continuing heating said salts for 72 hours at 650°C. in the presence of oxygen, and recovering the said lanthanum copper manganese oxide compound, La Cu$_{.5}$ Mn$_{.5}$ O$_3$, therefrom.

2. The process according to claim 1 wherein the lanthanum salt is lanthanum nitrate.

3. The process according to claim 1 wherein the manganese salt is manganese nitrate.

4. The process according to claim 1 wherein the copper salt is copper nitrate.

* * * * *